US012729913B2

(12) United States Patent
Lee et al.

(10) Patent No.: US 12,729,913 B2
(45) Date of Patent: Sep. 8, 2026

(54) DRYING DEVICE WITH AUTOMATICALLY ADJUSTABLE SHIELD FILM

(71) Applicant: LG Energy Solution, Ltd., Seoul (KR)

(72) Inventors: Byeong Won Lee, Daejeon (KR); Young Gyu Moon, Daejeon (KR); Jae Man Hwang, Daejeon (KR); In Gu Kim, Daejeon (KR); Sung Myung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 425 days.

(21) Appl. No.: 18/561,902

(22) PCT Filed: Jan. 26, 2023

(86) PCT No.: PCT/KR2023/001165

§ 371 (c)(1),
(2) Date: Nov. 17, 2023

(87) PCT Pub. No.: WO2023/146288

PCT Pub. Date: Aug. 3, 2023

(65) Prior Publication Data

US 2024/0271868 A1 Aug. 15, 2024

(30) Foreign Application Priority Data

Jan. 27, 2022 (KR) ........................ 10-2022-0011994

(51) Int. Cl.
*F26B 21/30* (2026.01)
*F26B 3/04* (2006.01)
(Continued)

(52) U.S. Cl.
CPC ................ *F26B 21/30* (2026.01); *F26B 3/04* (2013.01); *F26B 3/30* (2013.01); *F26B 21/50* (2026.01); *H01M 4/0404* (2013.01)

(58) Field of Classification Search
CPC .. F26B 21/30; F26B 21/50; F26B 3/04; F26B 3/30; H01M 4/0404
(Continued)

(56) References Cited

U.S. PATENT DOCUMENTS 3,494,048 A 2/1970 Du
5,528,839 A * 6/1996 Seidl ........................ F26B 21/20 34/364
(Continued)

FOREIGN PATENT DOCUMENTS

CN 206153096 U 5/2017
CN 214917802 U 11/2021
(Continued)

OTHER PUBLICATIONS

International Search Report for PCT/KR2023/001165 mailed May 11, 2023. 3 pages.

(Continued)

*Primary Examiner* — Stephen M Gravini
(74) *Attorney, Agent, or Firm* — Lerner David LLP

(57) ABSTRACT

A drying device includes an automatically adjustable shield film, a shielding region which can be automatically set according to the extent that a shield film part opens and closes an opening, a time loss of shield film replacement can be reduced, and drying defects due to improper installation of the shield film can be improved.

13 Claims, 6 Drawing Sheets

(51) Int. Cl.

| | |
|---|---|
| ***F26B 3/30*** | (2006.01) |
| ***F26B 21/50*** | (2026.01) |
| ***H01M 4/04*** | (2006.01) |

(58) Field of Classification Search

USPC ............................................................ 34/402

See application file for complete search history.

(56) References Cited

U.S. PATENT DOCUMENTS

| | | | | |
|---|---|---|---|---|
| 6,645,675 | B1 * | 11/2003 | Munshi | H01M 4/0404 429/234 |
| 8,771,383 | B2 * | 7/2014 | Sanada | H01M 4/0419 29/623.5 |
| 9,017,868 | B2 * | 4/2015 | Matsuda | H01M 4/8864 29/623.5 |
| 9,863,704 | B2 * | 1/2018 | Vild | F26B 25/005 |
| 9,920,991 | B2 * | 3/2018 | Watterodt | B23K 26/402 |
| 10,006,714 | B2 * | 6/2018 | Schmidt | F26B 25/006 |
| 10,363,499 | B2 * | 7/2019 | Thrasher | F26B 11/04 |
| 12,103,039 | B2 * | 10/2024 | Efner | B05D 3/0281 |
| 12,130,083 | B1 * | 10/2024 | Goldberg | F26B 3/12 |
| 12,584,689 | B2 * | 3/2026 | Zielinski | F26B 9/003 |
| 2013/0011546 | A1 | 1/2013 | Izumiya et al. | |
| 2015/0086866 | A1 | 3/2015 | Park et al. | |
| 2020/0156128 | A1 | 5/2020 | Yoo et al. | |
| 2024/0216880 | A1 * | 7/2024 | Sood | B01F 33/71 |
| 2024/0271868 | A1 * | 8/2024 | Lee | F26B 13/002 |

FOREIGN PATENT DOCUMENTS

| | | | | | |
|---|---|---|---|---|---|
| CN | 117280485 | A | * | 12/2023 | F26B 21/50 |
| EP | 3489815 | A1 | | 5/2019 | |
| JP | h08-086567 | A | | 4/1996 | |
| JP | H10 38462 | A | | 2/1998 | |
| JP | 3129765 | U | | 3/2007 | |
| JP | 2012-198012 | A | | 10/2012 | |
| JP | 5529649 | B2 | * | 6/2014 | H01M 4/0404 |
| JP | 2016-150476 | A | | 8/2016 | |
| KR | 20090048233 | A | | 5/2009 | |
| KR | 101323882 | B1 | * | 10/2013 | H01M 4/0419 |
| KR | 20180079782 | A | | 7/2018 | |
| KR | 20200059001 | A | | 5/2020 | |
| KR | 20210098755 | A | | 8/2021 | |
| KR | 20220009095 | A | | 1/2022 | |
| KR | 20230115464 | A | * | 8/2023 | F26B 21/50 |
| WO | 2011/117998 | A1 | | 9/2011 | |
| WO | 2020053103 | A1 | | 3/2020 | |
| WO | WO-2023146288 | A1 | * | 8/2023 | F26B 21/50 |

OTHER PUBLICATIONS

Extended European Search Report including Written Opinion for Application No. 23747329.3 dated Aug. 19, 2024. 8 pgs.

Database WPI week 199817 Thomson Scientific, London, GB; An 1998-182974 (2017). XP002811940. 1 pg.

Database WPI week 201734 Thomson Scientific, London, GB; An 2017-30662W (2017). XP002811938. 1 pg.

* cited by examiner

[Figure 1]
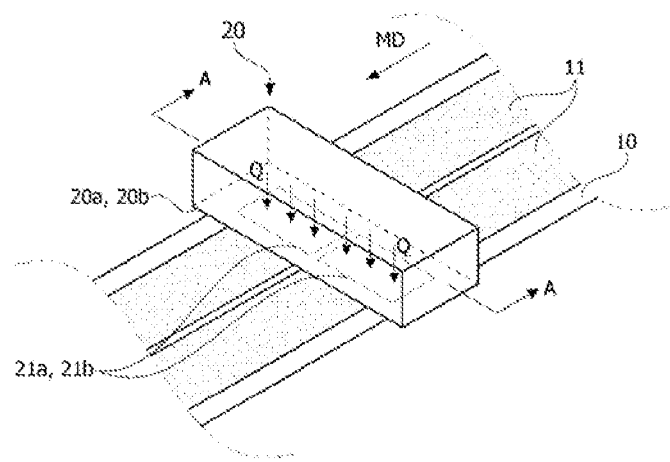
Prior Art
[Figure 2]
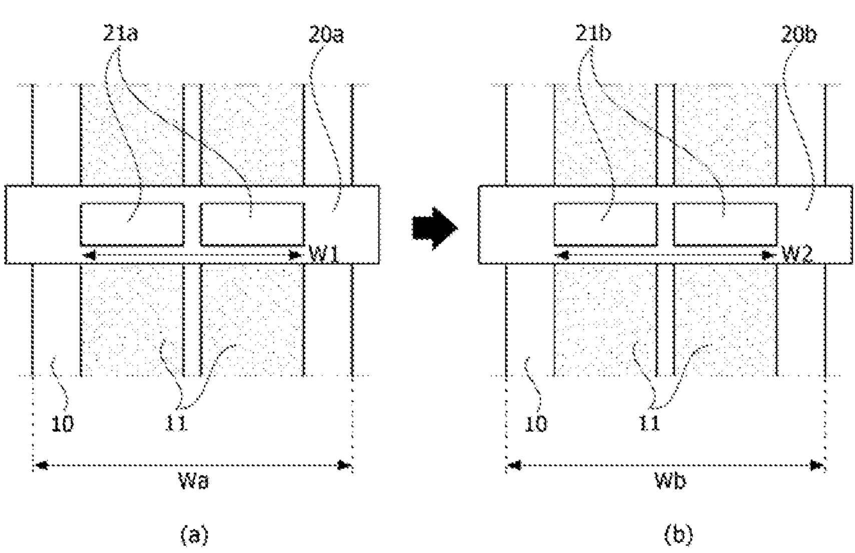
Prior Art

[Figure 3]
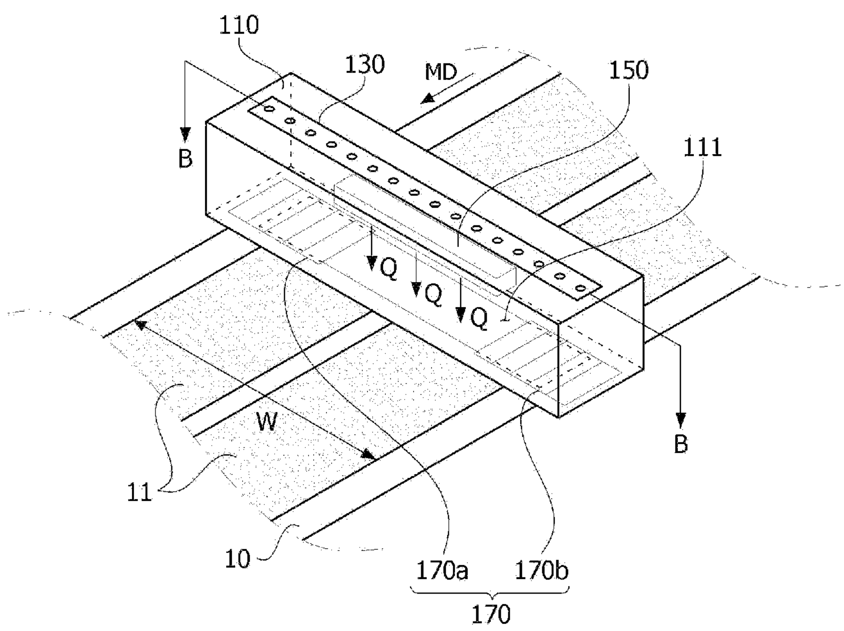
[Figure 4]
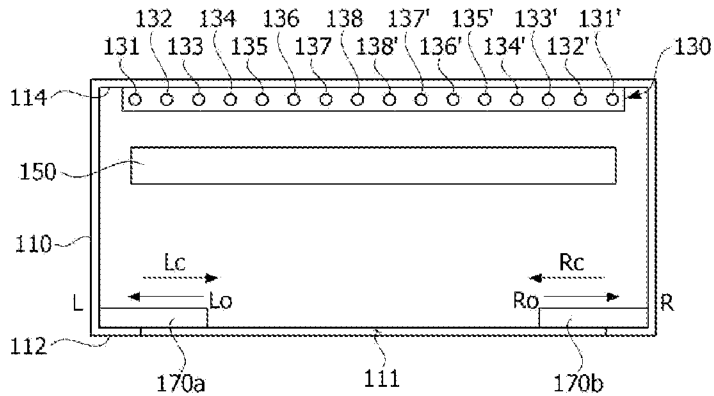

[Figure 5]
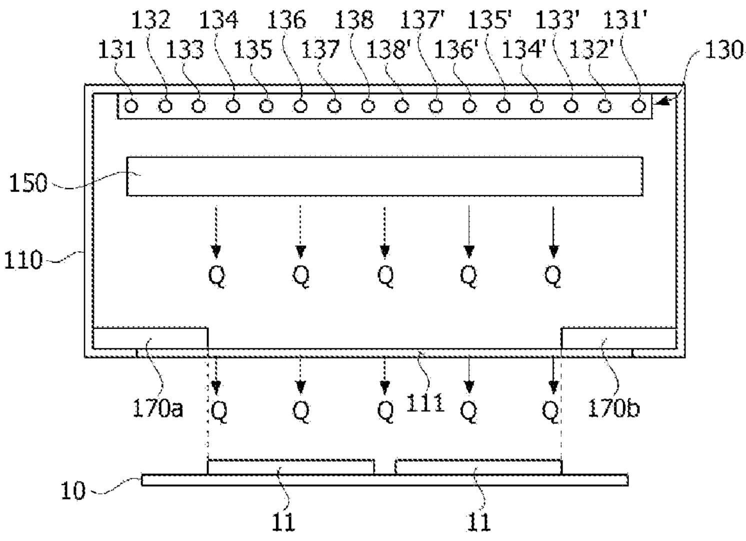
[Figure 6]
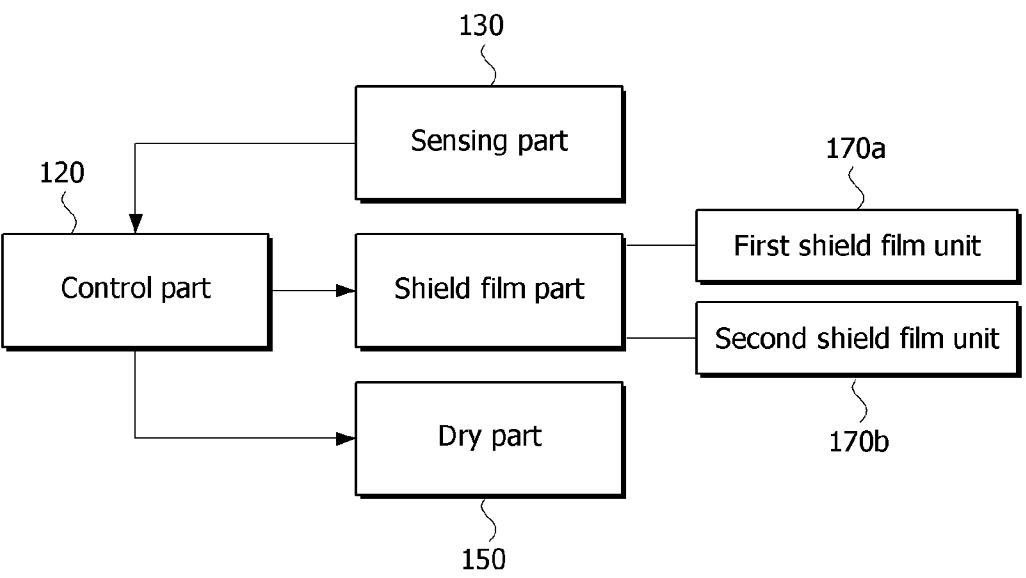

[Figure 7]
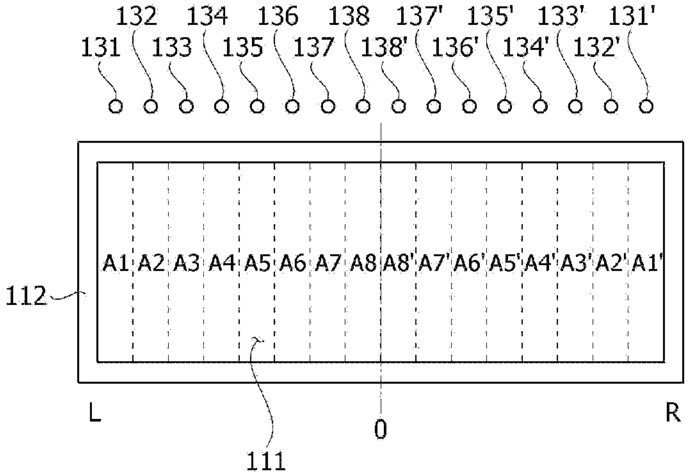
[Figure 8]
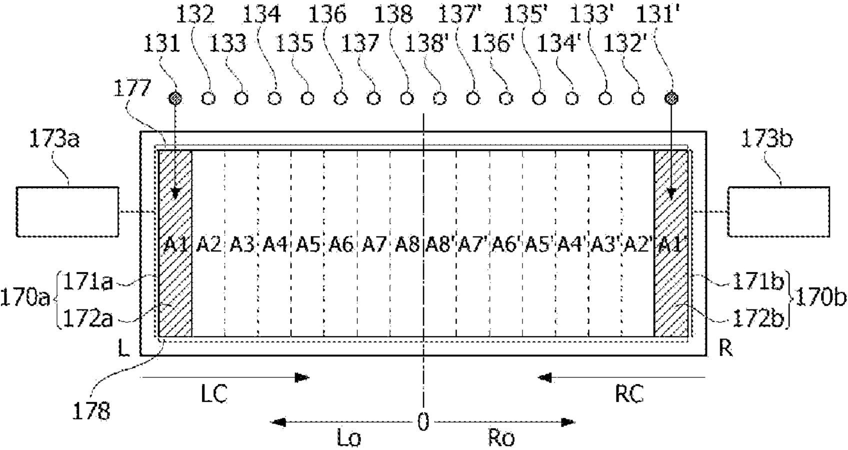

[Figure 9]
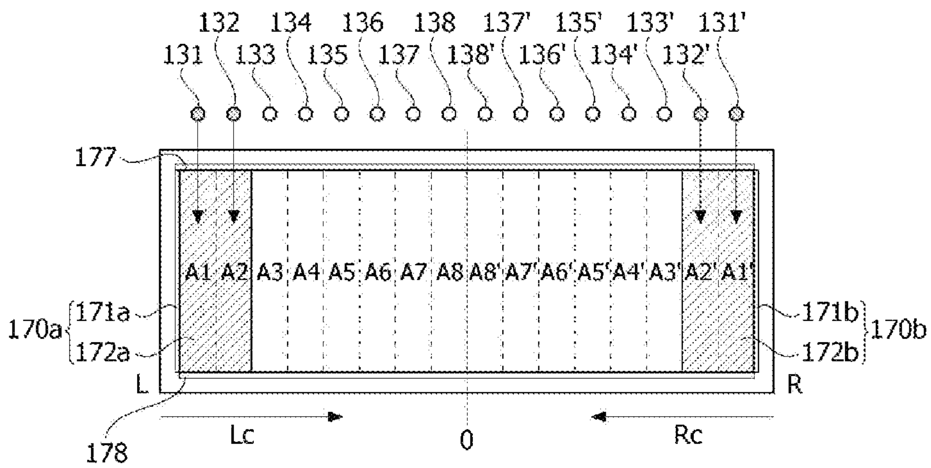
[Figure 10]
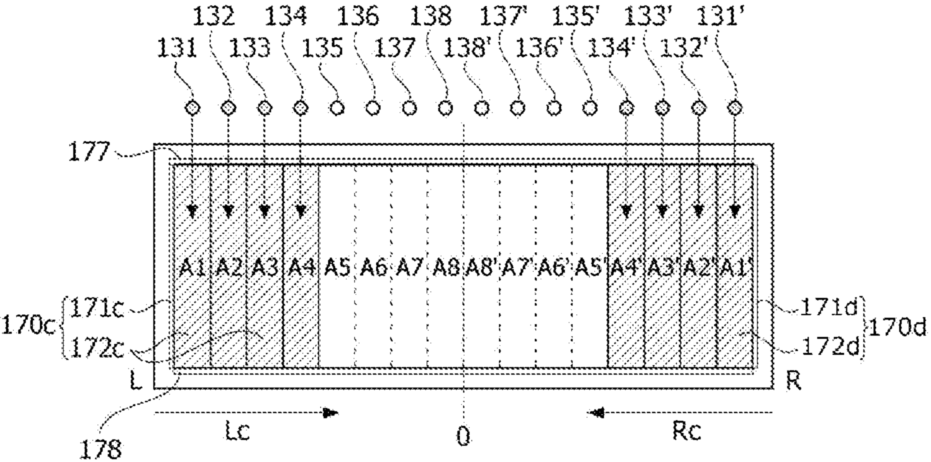

[Figure 11]

| Drying Zone | Shield Film Status | |
|---|---|---|
| | L | R |
| 1 Zone | - | - |
| 2 Zone | - | - |
| 3 Zone | 1 | 1 |
| 4 Zone | 2 | 2 |
| 5 Zone | 2 | 2 |
| 6 Zone | 2 | 2 |
| 7 Zone | 2 | 2 |
| 8 Zone | 3 | 3 |
| 9 Zone | 3 | 3 |
| 10 Zone | - | - |
| 11 Zone | - | - |
| 12 Zone | - | - |
| 13 Zone | - | - |

DRYING DEVICE WITH AUTOMATICALLY ADJUSTABLE SHIELD FILM

CROSS-REFERENCE TO RELATED APPLICATIONS

The present application is a national phase entry under 35 U.S.C. § 371 of International Application No. PCT/KR2023/001165, filed on Jan. 26, 2023, which claims priority from Korean Patent Application No. 10-2022-0011994, filed on Jan. 27, 2022, all of which are incorporated herein by reference.

TECHNICAL FIELD

The present disclosure relates to a drying device, which relates to, particularly, a drying device with an automatically adjustable shield film, and relates to, specifically, a drying device with an automatically adjustable shield film, in which a shielding region can be automatically set according to the extent that a shield film part opens and closes an opening.

BACKGROUND ART

A secondary battery is generally composed of electrodes (positive and negative electrodes), a separator, and an electrolyte, and is manufactured through a series of steps including an electrode process, an assembly process, and an activation process. Here, the positive electrode and the negative electrode are manufactured by coating an active material-containing slurry on a current collector of a sheet, mesh, film, or foil, and the like of aluminum or copper, followed by drying.

Meanwhile, the electrode process is also referred to as a polar plate process, which is a process of manufacturing a positive electrode and a negative electrode, which are essential components of a secondary battery. The electrode process specifically comprises a mixing process, a coating process, a rolling (calendar) process, a slitting process, and a drying process.

The positive electrode slurry prepared in the mixing process is applied to the positive electrode current collector in the coating process. Here, the negative electrode slurry is also applied to the negative electrode current collector in the coating process. The current collector applied with the slurry is cut to meet the designed standard through the rolling process and the slitting process.

After the slitting process, moisture in the slurry applied to each current collector is removed through the drying process before entering the assembly process. In this instance, hot air or infrared rays are mainly used to dry the coated slurry.

FIGS. 1 and 2 are views for explaining a process of drying a current collector using a drying device equipped with a shield according to the conventional technology, where FIG. 2 schematically depicts a cross-section of a state cut along the line A-A in FIG. 1.

Upon drying the current collector (10), heat (Q) is applied to the current collector (10). At this time, a drying speed difference occurs in the width direction (Wa, Wb) of the current collector (10), which is a direction perpendicular to the current collector running direction (MD). Specifically, the central portion of the current collector (10) dries later than both edges of the current collector (10), which affects production efficiency degradation and coating quality.

Particularly, when high-temperature gas injected from a nozzle contacts the current collector (10) to evaporate a solvent, there is a problem that while the hot air flow rate at the edge of the current collector (10) is relatively faster than the hot air flow rate at the center of the current collector (10), the drying is first completed at the edges of the current collector than at the center.

That is, due to the difference between the diffusion rate of the internal solvent and the evaporation rate of the surface to be dried, the drying degree difference of the slurry (11) in the width direction of the current collector (10) occurs at the edges of the current collector (10) and the center portion of the current collector (10). Thus, defects such as cracks occur on the surface to be dried.

Conventionally, as shown in FIG. 1, as the drying device (20) is provided with a detachably coupled shield (20*a*), the problem of hot air concentrating on the edges of the current collector (10) has been solved.

Meanwhile, depending on the coating width of the current collector (10), the use of a shield (20*a*) with different specifications is required. Conventionally, the shields (20*a*, 20*b*) to match each model according to the widths (Wa, Wb) of the current collector (10) are replaced and used.

Referring to part (a) of FIG. 2, in order to dry the current collector (10) of Model A in which the current collector (10) has a width (Wa) of 1040 mm, a shield A (20*a*) having the specification according to Model A is used. In this instance, the opening (21*a*) of the shield A (20*a*) has a width (W1) of 800 mm.

Referring to part (b) of FIG. 2, as another example, in order to dry the current collector (10) of Model B in which the current collector (10) has a width (Wb) of 1140 mm, a shield B (20*b*) having the specification according to Model B is used. In this instance, the opening (21*b*) of the shield B (20*b*) has a width (W2) of 900 mm.

However, in the conventional drying device (20), when the coating width and coating pattern differences are large for each model of the current collector (10), a design change of the shielding plate is required for each model. Conventionally, the replacement of the shields (20*a*, 20*b*) is required for each model of the current collector (10).

Upon replacing the shields (20*a*, 20*b*), the time loss occurs as the process is stopped during the replacement time, and the process instability occurs due to improper installation of the shields.

Due to the improper installation of the shield (20*a* or 20*b*), the thermal expansion coefficients of the coated portion (11, portion where the slurry is applied) and the uncoated portion (portion where the slurry is not applied) of the current collector (10) are different from each other, so that there may be a problem of the electrode, such as wrinkles or cracks.

The problem of the electrode, such as wrinkles or cracks, may affect the adhesion force between the slurry (11) and the current collector (10), and in this case, there may be a problem such as separation of the slurry and the current collector (10) during subsequent processes.

Therefore, a technique capable of automatically setting the shielding region without replacing the shields (20*a*, 20*b*) is required.

DISCLOSURE

Technical Problem

The present disclosure is intended to provide a drying device with an automatically adjustable shield film in which a shielding region can be automatically set according to the extent that a shield film part opens and closes an opening.

Technical Solution

A drying device with an automatically adjustable shield film according to one example of the present invention comprises: a housing installed on a transport path of a base material and having an opening on a reference surface facing the base material; a dry part installed in the housing to provide heat to the base material through the opening; a shield film part provided to cover a partial region of the opening and movably provided along the longitudinal direction of the opening to adjust an open area of the opening; a sensing part provided to sense a region where the shield film part covers the opening; and a control part controlling operation of the shield film part based on coating pattern information including width information of the base material and width information of a slurry applied to the base material, and sensing information of the sensing part.

Also, the shield film part may be provided to move in a unit of 1/n (n is a natural number of 2 or more) of the opening area toward a close direction based on both edges of the opening, where the close direction may be a direction moving from the edges of the opening toward the center of the opening.

In addition, the shield film part may be provided to move in a unit of 1/n (n is a natural number of 2 or more) of the opening area toward an open direction, where the open direction may be a direction moving from the center of the opening toward the edges of the opening.

Furthermore, the shield film part may comprise a pair of guide members installed on the reference surface along the longitudinal direction of the opening, and a plurality of shield film units movably installed on the pair of guide members and operated to cover one region or the entire region of the opening while moving in a close direction or an open direction. In addition, the close direction may be a direction moving from the edges of the opening toward the center of the opening, and the open direction may be a direction opposite to the close direction.

Also, the plurality of shield film units may comprise a first shield film unit covering one region of the opening while moving along the pair of guide members and a second shield film unit covering the other region of the opening while moving along the pair of guide members.

In addition, the first shield film unit may comprise, on one side of the opening, a first reference bar installed on the reference surface, a first shield film member moving in the close direction or the open direction, wherein one end is wound around the first reference bar, and the other end is provided to be movable to the pair of guide members, along a rotation direction of the first reference bar, and a first drive unit providing rotative force to the first reference bar.

The second shield film unit may comprise, on the other side of the opening, a second reference bar installed on the reference surface, a second shield film member moving in the close direction or the open direction, wherein one end is wound around the second reference bar, and the other end is provided to be movable to the pair of guide members, along a rotation direction of the second reference bar, and a second drive unit providing rotative force to the second reference bar.

Also, the first shield film unit comprises a plurality of first shield film members covering 1/n (n is a natural number of 2 or more) of the opening area, where the plurality of first shield film members may be provided to be folded and unfolded in multiple stages along the pair of guide members.

In addition, the second shield film unit comprises a plurality of second shield film members covering 1/n (n is a natural number of 2 or more) of the opening area, where the plurality of second shield film members may be provided to be folded and unfolded in multiple stages along the pair of guide members.

Furthermore, the sensing part comprises a plurality of sensing sensors, where the plurality of sensing sensors may be disposed apart in a line along the longitudinal direction of the opening.

Also, the plurality of sensing sensors may be disposed apart from each other at intervals of 1/n (n is a natural number of 2 or more) of the opening length.

In addition, the plurality of sensing sensors may be disposed on an opposite surface of the housing facing the opening.

Furthermore, the control part may calculate a close region in which the shield film part covers the opening based on the sensing information of the sensing sensor, and adjust an open region of the opening through the shield film part based on the coating pattern information.

Advantageous Effects

As described above, according to the drying device with an automatically adjustable shield film pursuant to one example of the present invention, a shielding region can be automatically set according to the extent that a shield film part opens and closes an opening, a time loss of shield film replacement can be reduced, and drying defects due to improper installation of the shield film can be improved.

DESCRIPTION OF DRAWINGS

FIGS. 1 and 2 are views for explaining a process of drying a current collector using a drying device equipped with a shield according to the conventional technology.

FIG. 3 schematically illustrates an installation state diagram of a drying device with an automatically adjustable shield film according to one example of the present invention.

FIG. 4 schematically illustrates a cross-section of a drying device with an automatically adjustable shield film taken along the B-B cross-section of FIG. 3.

FIG. 5 is a view for explaining a process of providing heat to a base material upon operation of a drying device.

FIG. 6 schematically illustrates a configuration diagram of a drying device with an automatically adjustable shield film according to one example of the present invention.

FIG. 7 is a view for explaining an arrangement state of an opening of a housing and a plurality of sensing sensors before a shield film part is installed, in one example of the present invention.

FIGS. 8 and 9 are views for explaining an operating state of a shield film part according to one example.

FIG. 10 is a view for explaining an operating state of a shield film part according to another example.

FIG. 11 schematically illustrates coating pattern information recipes preset in a control part.

DETAILED DESCRIPTION

Hereinafter, a drying device with an automatically adjustable shield film according to one example of the present invention will be described in detail with reference to the accompanying drawings.

In addition, regardless of the reference numerals, the same or corresponding components are given by the same or similar reference numerals, and duplicate descriptions thereof will be omitted, and for convenience of explanation, the size and shape of each component as shown can be exaggerated or reduced.

FIG. 3 schematically illustrates an installation state diagram of a drying device with an automatically adjustable shield film according to one example of the present invention, FIG. 4 schematically illustrates a cross-section of a drying device with an automatically adjustable shield film taken along the B-B cross-section of FIG. 3, and FIG. 5 is a view for explaining a process of providing heat to a base material upon operation of a drying device.

In addition, FIG. 6 schematically illustrates a configuration diagram of a drying device with an automatically adjustable shield film according to one example of the present invention.

A drying device (100) with an automatically adjustable shield film according to one example of the present invention comprises a housing (110), a control part (120), a sensing part (130), a dry part (150), and a shield film part (170).

The drying device (100) comprises a housing (110) installed on a transport path of a base material (10) and having an opening (111) on a reference surface (112) facing the base material (10), a dry part (150) installed in the housing (110) to provide heat to the base material (10) through the opening (111), a shield film part (170) provided to cover a partial region of the opening (111) and movably provided along the longitudinal direction of the opening (111) to adjust an open area of the opening (111), a sensing part (130) provided to sense a region where the shield film part (170) covers the opening (111), and a control part (120) controlling operation of the shield film part (170) based on coating pattern information including width information of the base material (10) and width information of a slurry (11) applied to the base material (10), and sensing information of the sensing part (130).

Referring to FIG. 3, the housing (110) is installed on the transport path (MD) of the base material (10). The housing (110) is provided with the opening (111) on the reference surface (112) facing the base material (10). The sensing part (130), the dry part (150), and the shield film part (170) are each installed inside the housing (110).

The sensing part (130) is installed on the opposite surface (114) of the housing (110). The opposing surface (114) is a surface facing the reference surface (112). The sensing part (130) may be installed, on the opposite surface (114), inside the housing (110) in the longitudinal direction of the opening (111). The sensing part (130) senses a region where the shield film part (170) covers the opening (111).

The sensing part (130) may comprise a plurality of sensing sensors. For each sensing sensor, a sensor number may be previously set in the control part (120) according to an arrangement order.

FIG. 7 is a view for explaining an arrangement state of an opening of a housing and a plurality of sensing sensors before a shield film part is installed, in one example of the present invention.

The plurality of sensing sensors is disposed apart in a line along the longitudinal direction of the opening (111). The plurality of sensing sensors may be disposed apart from each other at intervals of 1/n of the length of the opening (111), and in this document, n is a natural number of 2 or more.

Referring to FIGS. 4 and 7, for n sensing sensors, the sensing sensors disposed on the left side of the center of the opening (111) are referred to as "L-sensing sensors (131 to 138)", and the sensing sensors disposed on the right side of the center of the opening (111) are referred to as "R-sensing sensors (131' to 138')".

In addition, each sensing sensor is numbered such that the sensor number increases from both side edges of the opening (111) toward the center of the opening (111) according to the arrangement order, whereby the sensor numbers may be stored in the control part (120).

For convenience of description, the "L-sensing sensors (131 to 138)" are divided and referred to as "first L-sensing sensor (131) to eighth L-sensing sensor (138)" according to the arrangement order of the sensors. Then, the "R-sensing sensors (131' to 138')" are divided and referred to as "first R-sensing sensor (131') to eighth R-sensing sensor (138')" according to the arrangement order of the sensors.

In addition, the left portion of the opening (111) may be divided into regions A1 to A8 based on the center of the opening, and the right portion may be divided into regions A'1 to A8' based on the center of the opening.

When the opening (111) is divided into 16 regions along the longitudinal direction of the opening (111), the regions A1 to A8 and the regions A1' to A8' refer to the respective division regions. The virtual division region of the opening (111) is variable according to the number of installed sensing sensors. Also, the number of installed sensing sensors may be set to be equal to the number of virtual division regions.

Here, the first L-sensing sensor (131) is installed in the housing (110) to face the region A1 of the opening (111). The first L-sensing sensor (131) senses the closing of the region A1 by the shield film part (170). The second L-sensing sensor (132) senses the closing of the region A2 by the shield film part (170). The third L-sensing sensor (133) senses the closing of the region A3 by the shield film part (170). The fourth L-sensing sensor (134) senses the closing of the region A4 by the shield film part (170).

The fifth L-sensing sensor (135) senses the closing of the region A5 by the shield film part (170). The sixth L-sensing sensor (136) senses the closing of the region A6 by the shield film part (170). The seventh L-sensing sensor (137) senses the closing of the region A7 by the shield film part (170). The eighth L-sensing sensor (138) senses the closing of the region A8 by the shield film part (170).

The first R-sensing sensor (131') senses the closing of the region A1' by the shield film part (170). The second R-sensing sensor (132') senses the closing of the region A2' by the shield film part (170). The third R-sensing sensor (133') senses the closing of the region A3' by the shielding part (170). The fourth R-detecting sensor (134') senses the closing of the region A4' by the shield film part (170).

The fifth R-sensing sensor (135') senses the closing of the region A5' by the shield film part (170). The sixth R-detecting sensor (136') senses the closing of the region A6' by the shield film part (170). The seventh R-sensor (137') senses the closing of the region A7' by the shield film part (170). The eighth R-sensing sensor (138') senses the closing of the region A8' by the shield film part (170).

FIGS. 8 and 9 are views for explaining an operating state of a shield film part according to one example, and FIG. 10 is a view for explaining an operating state of a shield film part according to another example.

The shield film part (170) is installed in the housing (110) to open and close the opening (111) on the reference surface (112). The shield film part (170) is movably installed on the reference surface (112) along the longitudinal direction of the opening (111) to adjust the open area of the opening (111). The shield film part (170) is provided to cover a partial region or the entire region including both sides of the opening (111) in the width direction of the opening (111).

The shield film part (170) includes a pair of guide members (177, 178), a first shield film unit (170*a*) and a second shield film unit (170*b*).

Here, the pair of guide members (177, 178) are disposed apart from each other side by side along the width direction of the opening (111), and each installed on the reference surface (112) along the length direction of the opening (111).

The first shield film unit (170*a*) and the second shield film unit (170*b*) are movably installed on the pair of guide members (177, 178), respectively, and are operated to cover a partial region or the entire region of the opening (111) while moving in close directions or open directions.

Here, the close directions (Lc, Rc) are directions moving from the edges of the opening (111) toward the center of the opening (111). Also, the open directions (Lo, Ro) are directions opposite to the close directions. The open directions (Lo, Ro) are directions moving from the center (o) of the opening (111) toward the edges of the opening (111).

The first shield film unit (170*a*) is provided to cover one side region of the opening (111) while moving along the pair of guide members (177, 178). The first shield film unit (170*a*) opens and closes one side region of the opening (111) by control of the control part (120) while moving in the first close direction (Lc) or the first open direction (Lo) in a unit of 1/n of the opening area.

Upon reduction of the open region of the opening (111), the first shield film unit (170*a*) may adjust the open region of the opening (111) by control of the control part (120) while moving toward the first close direction (Lc) in a unit of 1/n of the opening area based on one side edge of the opening (111).

Then, upon expansion of the open region of the opening (111), the first shield film unit (170*a*) may adjust the open region of the opening (111) by control of the control part (120) while moving toward the first open direction (Lo) in a unit of 1/n of the opening area.

For example, referring to FIGS. 8 and 9, the first shield film unit (170*a*) comprises a first reference bar (171*a*), a first shield film member (172*a*), and a first drive unit (173*a*).

The first reference bar (171*a*) is installed on the reference surface (112) at one side of the opening (111). The first shield film member (172*a*) is connected to the first reference bar (171*a*) in a roll screen type.

The first shield film member (172*a*) is provided such that one end is wound around the first reference bar (171*a*) and the other end is movable to the pair of guide members (177, 178). In addition, the first shield film member (172*a*) is operated to cover one side region of the opening (111) while moving in the close direction or the open direction according to the rotation direction of the first reference bar (171*a*).

The first drive unit (173*a*) is coupled to the first reference bar (171*a*) to provide rotative force to the first reference bar (171*a*). According to the rotation direction of the first drive unit (173*a*), the first shield film member (172*a*) is wound around the first reference bar (171*a*) while moving in the first open direction (Lo), or unwound from the first reference bar (171*a*) while moving in the first close direction (Lc).

As another example, referring to FIG. 10, the first shield film unit (170*c*) comprises a reference bar (171*c*) and a plurality of first shield film members (172*c*). Each of the first shield film members (172*c*) is provided to cover 1/n of the opening area. The reference bar (171*c*) is installed on one side of the opening (111).

The plurality of first shield film members (172*c*) may have a shutter structure that is folded and unfolded in multiple stages along a pair of guide members based on the reference bar (171*c*). The first shield film member (172*c*) is operated to cover one side region of the opening (111) in a unit of 1/n of the opening area while moving along the pair of guide members (177, 178).

The second shield film unit (170*d*) is provided to cover the other side region of the opening (111) while moving along the pair of guide members (177, 178). The second shield film unit (170*d*) opens and closes the other side region of the opening (111) by control of the control part (120) while moving in the second close direction (Rc) or the second open direction (Ro) in a unit of 1/n of the opening area.

Upon reduction of the open region of the opening (111), the second shield film unit (170*d*) may adjust the open region of the opening (111) by control of the control part (120) while moving toward the second close direction (Rc) in a unit of 1/n of the opening area based on one side edge of the opening (111).

Then, upon expansion of the open region of the opening (111), the second shield film unit (170*b*) may adjust the open region of the opening (111) by control of the control part (120) while moving toward the second open direction (Ro) in a unit of 1/n of the opening area.

Referring to FIGS. 8 and 9, the second shield film unit (170*b*) comprises a second reference bar (171*b*), a second shield film member (172*b*), and a second drive unit (173*b*).

The second reference bar (171*b*) is installed on the reference surface (112) at the other side of the opening (111). The second shield film member (172*b*) is connected to the second reference bar (171*b*) in a roll screen type.

The second shield member (172*b*) is provided such that one end is wound around the second reference bar (171*b*) and the other end is movable to the pair of guide members (177, 178). The second shield member (172*b*) is operated to cover the other side region of the opening (111) while moving in the close direction or the open direction according to the rotation direction of the second reference bar (171*b*).

The second drive unit (173*b*) is coupled to the second reference bar (171*b*) to provide rotative force to the second reference bar (171*b*). According to the rotation direction of the second drive unit, the second shield member (172*b*) is wound around the second reference bar (171*b*) while moving in the second open direction (Ro). Alternatively, the second shield member (172*b*) is unwound from the second reference bar (171*b*) while moving in the second close direction (Rc).

As another example, referring to FIG. 10, the second shield film unit (170*d*) comprises a second reference bar (171*d*) and at least one second shield film member (172*d*). The second reference bar (171*d*) is installed on the other side of the opening.

The second shield film member (172*d*) is provided to cover 1/n of the opening area. The at least one second shield film member (172*d*) may have a shutter structure that is folded and unfolded in multiple stages along a pair of guide members based on the second reference bar (171*d*).

The second shield film member (172*d*) is operated to cover the other side region of the opening (111) in a unit of 1/n of the opening area while moving along the pair of guide members (177, 178).

The dry part (150) is installed in the housing (110) so that heat (Q) can be provided to the base material (10) through the opening (111). As the dry part (150), a heating device capable of drying the slurry applied to the base material may be used, and for example, various types of heating devices such as hot air or infrared rays may be used as the dry part (150).

The control part (120) controls the operation of the shield film part (170) based on the coating pattern information and the sensing information of the sensing part (130). The coating pattern information may comprise width information of the base material (10) and width information of the slurry (11) applied to the base material (10). In addition, in this document, the base material (10) means a positive or negative current collector.

A sensor number for each sensing sensor is preset in the control part (120). When the close region by the shield film part is sensed by each sensing sensor, the control part (120) obtains sensing information according to the sensor number.

The control part (120) may calculate a close region where the shield film part (170) covers the opening (111), based on the sensing information. Then, the control part (120) may adjust the open region of the opening (111) by controlling the operation of the shield film part (170) to match the coating pattern information based on the coating pattern information and the close region calculation information.

FIG. 11 schematically illustrates coating pattern information settings preset in a control part.

Referring to the coating pattern information of FIG. 11, a plurality of drying zones provided along the transport path of the base material may be classified into "first to thirteenth drying zones", and drying devices may be disposed for each drying zone. In addition, a close region of a drying device disposed in the relevant drying zone may be set differently for each drying zone. The close region may be adjusted by the shield film part (170).

As one example, drying settings according to coating pattern information for each drying zone are as follows.

Referring to FIG. 11, the drying settings of the first drying zone and the second drying zone may be set such that the shield film opens the entire region of the opening (111).

The drying setting of the third drying zone may be set such that the first shield film unit (170*a*) and the second shield film unit (170*b*) each close one region (e.g., region A1 and region A1'), and open regions A2 to A8 and regions A2' to A8' excluding the region A1 and region A1'.

The drying settings of the fifth, sixth, and seventh drying zones may be set such that the first shield film unit (170*a*) and the second shield film unit (170*b*) each close two regions (e.g., region A1, region A2, region A1', and region A2'), and open regions A3 to A8, and regions A3' to A8'.

The drying settings of the eighth and ninth drying zones may be set such that the first shield film unit (170*a*) and the second shield film unit (170*b*) each close three regions (e.g., regions A1 to A3, and regions A1' to A3'), and open regions A4 to A8, and regions A4' to A8'.

In addition, the drying settings of the $10^{th}$ to $13^{th}$ drying zones may be set such that the shield films open the entire region of the opening (111).

Accordingly, as the shielding region is automatically set to the extent that the shield film part opens and closes the opening, one example of the present invention can reduce the time loss of shield film replacement, and improve drying defects due to improper installation of the shield film.

The preferred examples of the present invention as described above have been disclosed for illustrative purposes, and those skilled in the art having ordinary knowledge of the present invention will be able to make various modifications, changes, and additions within the spirit and scope of the present invention, and such modifications, changes, and additions should be regarded as falling within the scope of the following claims.

INDUSTRIAL APPLICABILITY

As described above, according to the drying device with an automatically adjustable shield film pursuant to one example of the present invention, a shielding region can be automatically set according to the extent that a shield film part opens and closes an opening, a time loss of shield film replacement can be reduced, and drying defects due to improper installation of the shield film can be improved.

The invention claimed is:

1. A drying device, comprising:

a housing installed along a transport path of a base material and having an opening on a reference surface facing the base material;

a dry part installed in the housing and configured to provide heat to the base material through the opening;

a shield film part provided to cover a partial region of the opening and to move along a longitudinal direction of the opening to adjust an open area of the opening;

a sensing part provided to sense a region where the opening is covered by the shield film part; and a control part configured to control operation of the shield film part based on a coating pattern information including a width information of the base material, a width information of a slurry disposed on the base material, and a sensing information of the sensing part.

2. The drying device according to claim 1, wherein the shield film part is provided to move by a unit of 1/n of an opening area in a close direction based on both edges of the opening in the longitudinal direction, wherein n is a natural number of 2 or more, and the close direction extends from the edges of the opening toward a center of the opening.

3. The drying device according to claim 2, wherein the shield film part is configured to move in an open direction by the unit of 1/n, and the open direction extends from the center of the opening toward the edges of the opening.

4. The drying device according to claim 1, wherein the shield film part comprises: a pair of guide members installed on the reference surface extending along the longitudinal direction of the opening; and a plurality of shield film units configured to move along the pair of guide members, so as to cover the partial region or an entire region of the opening while moving in a close direction or an open direction, and the close direction extends from the edges of the opening toward a center of the opening, and the open direction extends opposite to the close direction.

5. The drying device according to claim 4, wherein the plurality of shield film units comprises:

a first shield film unit configured to cover one region of the opening while moving along the pair of guide members; and a second shield film unit configured to cover an other region of the opening while moving along the pair of guide members.

6. The drying device according to claim 5, wherein the first shield film unit comprises:

a first reference bar installed on the reference surface of a first side of the opening;

a first shield film member configured to move in the close direction or the open direction, where a first end of the first shield film is coupled to the first reference bar, and a second end of the first shield film is configured to move along the pair of guide members, wherein the first shield film is configured to be wound around the first reference bar along a rotation direction of the first reference bar; and a first drive unit configured to provide a rotative force to the first reference bar.

7. The drying device according to claim 5, wherein the second shield film unit comprise:

a second reference bar installed on the reference surface of a second side of the opening, wherein the second side is disposed opposite to a first side of the opening in the longitudinal direction;

a second shield film member configured to move in the close direction or the open direction, where a first end of the second shield film is coupled to the second reference bar, and a second end of the second shield film is configured to move along the pair of guide members, wherein the second shield film is configured to be wound around the second reference bar along a rotation direction of the second reference bar; and a second drive unit configured to provide a rotative force to the second reference bar.

8. The drying device according to claim 5, wherein the first shield film unit comprises a plurality of first shield film members configured to cover 1/n of an opening area, wherein n is a natural number of 2 or more, and the plurality of first shield film members is configured to be folded and unfolded in a plurality of stages along the pair of guide members.

9. The drying device according to claim 5, wherein the second shield film unit comprises a plurality of second shield film members configured to cover 1/n of an opening area, wherein n is a natural number of 2 or more, and the plurality of second shield film members is configured to be folded and unfolded in a plurality of stages along the pair of guide members.

10. The drying device according to claim 1, wherein the sensing part comprises a plurality of sensing sensors, and the plurality of sensing sensors is disposed apart from each other and extend in a line along the longitudinal direction of the opening.

11. The drying device according to claim 10, wherein the plurality of sensing sensors is disposed apart from each other at intervals of 1/n of an opening length, wherein n is a natural number of 2 or more.

12. The drying device according to claim 11, wherein the plurality of sensing sensors is disposed on a surface of the housing facing the opening.

13. The drying device according to claim 10, wherein the control part is configured to calculates a close region in which the shield film part covers the opening based on the sensing information of the sensing sensor, and is configured to adjusts an open region of the opening through the shield film part based on the coating pattern information.

* * * * *